United States Patent
Fabian

(10) Patent No.: US 7,712,335 B2
(45) Date of Patent: May 11, 2010

(54) QUARTZ GLASS CYLINDER FOR PRODUCTION OF AN OPTICAL COMPONENT AND METHOD FOR PRODUCTION THEREOF

(75) Inventor: Heinz Fabian, Grossostheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1155 days.

(21) Appl. No.: 10/559,736

(22) PCT Filed: Jun. 2, 2004

(86) PCT No.: PCT/EP2004/005950

§ 371 (c)(1),
(2), (4) Date: Dec. 5, 2005

(87) PCT Pub. No.: WO2004/108615

PCT Pub. Date: Dec. 16, 2004

(65) Prior Publication Data

US 2006/0137401 A1    Jun. 29, 2006

(30) Foreign Application Priority Data

Jun. 4, 2003   (DE)   ................. 103 25 539

(51) Int. Cl.
C03C 15/00   (2006.01)
(52) U.S. Cl. .................. 65/31; 65/166; 65/105; 65/112; 65/21.5; 65/30.1; 65/61
(58) Field of Classification Search ............ 65/31, 65/112, 105, 166
See application file for complete search history.

(56) References Cited

U.S. PATENT DOCUMENTS 4,898,777 A  *  2/1990  Kindler et al. ............ 428/364

(Continued)

FOREIGN PATENT DOCUMENTS

| DE | 102 14 029 A1 | 5/2003 |
| EP | 0 598 349 A2 | 5/1994 |
| EP | 0 630 864 A2 | 12/1994 |
| EP | 1 000 908 A2 | 5/2000 |
| JP | 59165005 A * | 9/1984 |
| WO | WO03/080522 A1 | 10/2003 |

*Primary Examiner*—Khanh Nguyen
*Assistant Examiner*—Keith T Aziz
(74) *Attorney, Agent, or Firm*—Tiajoloff and Kelly LLP

(57) ABSTRACT

The aim of the invention is to improve a known quartz glass cylinder for the production of an optical component, comprising an inner drilling, which is mechanically machined to size and provided with an etched structure by means of an etching treatment, subsequent to the mechanical machining, such that in the application thereof for production of pre-forms and optical fibers, few bubbles arise along the boundary surface between core and sleeve. Said aim is achieved, whereby the etched structure comprises striations with a maximum depth of 2.0 mm and a maximum width of 100 μm. A method for production of such a quartz glass cylinder mechanically machined to size is characterized in that the mechanical machining comprises several serial removal processes with successively lower removal depths, whereby after the last removal process the inner drilling has sub-surface striations with a maximum depth of 2 mm and the inner drilling is subsequently subjected to an etching treatment such that an etching removal with a maximum depth of 50 μm is achieved.

9 Claims, 4 Drawing Sheets

U.S. PATENT DOCUMENTS

| | | | |
|---|---|---|---|
| 5,198,008 A * | 3/1993 | Thomas | 65/386 |
| 5,676,724 A * | 10/1997 | Barre et al. | 65/382 |
| 5,785,729 A * | 7/1998 | Yokokawa et al. | 65/385 |
| 5,837,334 A | 11/1998 | Yokokawa et al. | |
| 2001/0026997 A1 * | 10/2001 | Henley et al. | 438/458 |
| 2002/0121109 A1 * | 9/2002 | Aita | 65/30.13 |
| 2003/0230112 A1 * | 12/2003 | Ikeda et al. | 65/31 |
| 2005/0117863 A1 | 6/2005 | Fabian et al. | |

* cited by examiner

QUARTZ GLASS CYLINDER FOR PRODUCTION OF AN OPTICAL COMPONENT AND METHOD FOR PRODUCTION THEREOF

The present invention relates to a quartz glass cylinder for producing an optical component with an inner bore which is mechanically treated to a final dimension and is provided with an etched structure due to an etching treatment following mechanical treatment.

Furthermore, the present invention relates to a method for producing a quartz glass cylinder by mechanically treating the inner bore of the quartz glass cylinder to a final dimension and by subsequently subjecting the same to an etching treatment.

Such quartz glass cylinders serve to produce optical fibers and preforms for optical fibers. They are used as so-called "jacket tubes" to overclad core rods with cladding glass. Overcladding can be carried out by collapsing and elongating a coaxial arrangement of the hollow cylinder of quartz glass in the inner core of which the core rod is inserted. Preforms are thereby produced, from which optical fibers are subsequently drawn. It is also known that the hollow cylinder is collapsed onto a core rod during fiber drawing, the last-mentioned method being called "ODD (overclad-during-drawing) method".

A quartz glass cylinder and a method for producing the same according to the above-mentioned type are known from DE 102 14 029 A1. In the method described therein, a tube of synthetic quartz glass is manufactured by producing a soot body by flame hydrolysis of $SiCl_4$ and vitrifying said soot body to obtain a hollow cylinder of quartz glass and by subsequently treating the quartz glass block by means of a core drill. For a precise finishing operation of the tube obtained in this way it is suggested that the inner wall thereof should be reworked by means of a honing machine and should be honed in a final step using an abrasive of the fineness grade # 800. To reduce surface tensions and to eliminate damage caused by surface treatment, the treated tube of quartz glass is etched in hydrofluoric acid.

In parallel therewith, a so-called core rod is produced which consists of core glass of germanium-doped $SiO_2$ and which is surrounded by a cladding glass of undoped $SiO_2$.

For producing an optical fiber the core glass rod is inserted into the inner bore of the hollow cylinder of quartz glass and fixed therein with formation of a coaxial assembly. Starting with its lower end, said assembly is supplied from above to an electrically heated fiber drawing furnace at a predetermined feed speed and is heated therein to a temperature around 2180° C. and softened zonewise in this process. An optical fiber having an outer diameter of 125 μm is drawn off from the softened region. Due to plastic deformation in the furnace, the annular gap between the core rod and the hollow cylinder of quartz glass is closed, a negative pressure being maintained in the gap.

EP-A 598 349 describes a thick-walled quartz glass cylinder for producing a large-volume preform for optical fibers. The thick-walled cylinder is collapsed onto a core rod during elongation. Said method is known under the name "RIC (rod in cylinder) method". Several procedures are suggested for producing the quartz glass cylinder. The first procedure consists of two steps. In the first step of the procedure, a cylindrical quartz glass blank is provided. In the second step the blank is mechanically drilled for forming a central bore either by using a core drill, or it is subjected to a hot upsetting method to produce a bore. In the second procedure, porous silicic acid soot is deposited on a heat-resistant substrate tube, said tube is then removed, and the soot tube obtained thereby is dehydrated and vitrified.

It has been found that the preforms produced according to the known methods often comprise bubbles on the boundary surface between core rod and hollow cylinder, and that the quality of the fibers drawn from such preforms is often also inadequate. Particular attention is here paid to elongated bubbles along the boundary surface between core and cladding. These may result in low fiber strength and may particularly cause problems during splicing of the fibers.

It is the object of the present invention to provide a quartz glass cylinder which, when used for producing preforms and optical fibers, avoids the above-mentioned drawbacks. It is a further object of the present invention to indicate a method for producing such a quartz glass cylinder.

As for the quartz glass cylinder, said object, starting from the above-mentioned quartz glass cylinder, is achieved according to the invention in that the etched structure comprises cracks having a depth of not more than 2.0 mm and a width of not more than 100 μm.

It is possible by way of a mechanical treatment (particularly by drilling, honing and grinding) using known honing and grinding methods and commercially available devices suited therefor to produce a hollow cylinder of quartz glass having an outer diameter of more than 100 mm and a length of 2 m and more, said hollow cylinder being distinguished by an exact cylinder symmetry with accurate circular cross-section and a small dimensional deviation in the range of 1/100 mm.

So far it has been assumed that, apart from an exact dimensional accuracy and cylinder symmetry, the surface roughness of the mechanically treated hollow cylinder constitutes a decisive quality criterion for the suitability of the cylinder to be used for cladding a core rod in an RIC method. This becomes, for instance, apparent from the above-mentioned EP 0 598 349 A1, where the quality of the mechanically treated inner surface of the hollow cylinder of quartz glass is defined by way of roughness data.

However, it has been found that preforms and fibers obtained by using quartz glass cylinders having a mechanically treated inner bore often comprise bubbles on the boundary surface towards the core rod material, i.e. even in cases where quartz glass cylinders with a very smooth and thoroughly treated inner surface have been used. A definite correlation between the roughness of the inner bore of the hollow cylinder and the quality of the resulting boundary surface in a preform obtained according to the RIC method or the quality of the fiber drawn therefrom could not be detected. Problems arose especially during use of particularly thick-walled quartz glass cylinders with outer diameters of more than 100 mm.

Surface roughnesses are normally determined with the help of measuring methods in which a needle of a surface roughness measurement device travels along a predetermined path over the surface to be measured, thereby recording a surface profile. Detailed studies have shown that due to the mechanical treatment of the hollow cylinder cracks (subsurface cracks) arise in the near-surface area, said cracks being normally closed and thus not detectable with the standard roughness measurement methods.

It has now been found that the depth of such cracks may even be surprisingly large in cases where the damage layer produced by the previous removal process has been successively decreased in subsequent treatment stages and only small forces are still acting on the surface in the last treatment steps, resulting in a small removal. Nevertheless, these cracks would probably be harmless because they are closed and would therefore melt and completely disappear while the quartz glass cylinder is collapsed onto the core rod.

This, however, is no longer true if the hollow cylinder of quartz glass is subjected to the standard cleaning process in an etching solution directly before its use. In this etching process, the existing subsurface cracks are opened, i.e. over their whole depth, while simultaneously expanding in lateral direction during the etching process. Only these cracks that have been broadened due to acid cleaning may lead during the subsequent collapsing process to defects in the area of the boundary surface between core rod and hollow cylinder of quartz glass if they can no longer be closed. And the problems are increasing the broader and deeper the cracks in the etched structure are, the higher the viscosity of the surface is during collapsing and the shorter the collapsing period.

Since thick-walled quartz glass cylinders with outer diameters of more than 100 mm normally show a lower viscosity than thin-walled cylinders during collapsing in the area of their inner bore, the problems accompanying an etched structure that no longer fuses are increasingly found in thick-walled quartz glass cylinders. With larger gap widths between hollow cylinders of quartz glass and core rod it is more likely that the defects in the inner surface fuse before contact with the core rod than in the case of small gap widths. These manifold conditions regarding the presence or absence of defects in preforms and fibers due to mechanical treatment and etching of quartz glass cylinders are probably the reason why this problem has so far not been recognized.

As has been mentioned, the disadvantageous impacts of the etched structure on the preform and fiber quality can be reduced by suitable hot processes, such as a very slow collapsing. However, an inner surface optimized with respect to the prevention of surface defects is preferred in consideration of the costs incurred by hot processes.

Hence, it has become apparent that a decisive factor for the qualification of the cylinder for the RIC method is not primarily the surface roughness, but the etched structure produced due to the etching process by expansion of the existing near-surface cracks. Therefore, the main focus of the invention is not the surface roughness but, on the one hand, the minimization of subsurface cracks in the area of the inner bore of the quartz glass cylinder, which cracks are caused by the mechanical treatment, and on the other hand the restriction of the expansion of the cracks due to a final etching process to a maximum value, so that they can adequately melt also in the case of adverse conditions during the collapsing process (low temperature, rapid collapsing process, small gap width) and defects on the boundary surface between hollow cylinder of quartz glass and core rod are prevented or reduced.

The decisive criteria are the crack depth and the crack width in the etched structure after the etching process. After the mechanical treatment cracks deeper than 2.0 mm must not remain in the inner wall of the quartz glass cylinder, and after the etching process the resulting etched structure must not contain cracks broader than 100 µm at the same time.

It already follows from the above explanations that a cylinder mechanically treated to a final dimension is within the meaning of this invention a cylinder whose inner surface has been mechanically treated to a final dimension and which is subsequently cleaned by etching. Uniform etching processes do not cause a change in the geometrical final shape of the hollow cylinder (for instance a bend or ovality in cross section).

A particularly high quality of the boundary surface between hollow cylinder and core rod is accomplished when the etched structure comprises cracks having a depth of not more than 1.0 mm and a width of not more than 50 µm, preferably in an etched structure with cracks having a depth of not more than 0.5 mm and a width of not more than 20 µm.

On the other hand, particularly small and narrow cracks in the etched structure, whose elimination or prevention is extremely time-consuming and expensive, will no longer be noticed negatively even under adverse conditions during the collapsing process. Therefore, for reasons of costs it has turned out to be advantageous when it is not attempted to avoid or eliminate cracks altogether, but to allow an etched structure comprising cracks with a depth of at least 30 µm and a width of at least 5 µm.

Preferably, the quartz glass cylinder of the invention has an outer diameter of at least 150 mm.

The above-described measures with respect to the etched structure can be positively noticed particularly during use of large-volume hollow cylinders having outer diameters of at least 150 mm, for large-volume quartz glass cylinders are in general difficult to heat all over during the collapsing process and thus show in the area of their inner bore a comparatively high viscosity which intensifies the problems accompanying an etched structure that does no longer fuse.

As for the method, the above-mentioned technical object, starting from a method of the above-indicated type, is achieved according to the invention in that the mechanical treatment of the quartz glass cylinder comprises a plurality of subsequent removal processes with a successively decreasing removal depth, the inner bore comprising subsurface cracks with a depth of not more than 2 mm after the last removal process, and that the inner bore is subsequently subjected to an etching treatment in such a way that an etching removal with a depth of not more than 50 µm is achieved.

The mechanical treatment of the surface of the inner bore automatically creates cracks. The crack depth is successively reduced by repeated grinding and polishing or honing steps to such an extent that the crack depth is not more than 2 mm. The crack depth which can be tolerated according to the invention permits the use of hollow cylinders which require a less troublesome mechanical treatment of their inner wall and which can therefore be produced at comparatively low costs.

After completion of the mechanical treatment of the quartz glass cylinder the surface of the inner bore thus comprises closed cracks having a depth of not more than 2 mm. Due to the subsequent etching process, said cracks are opened. The crack depth does not change in this process, but the crack width. Said width is about twice as large as the etching removal in the area. With an etching removal of not more than 50 µm in the area, this will thus yield an etched structure with cracks having a maximum crack width of about 100 µm.

As for the advantageous effect of such an etched structure on the quality of the boundary surface between quartz glass cylinder and core rod after collapsing of the hollow cylinder in an RIC method, reference is made to the above explanations regarding the quartz glass cylinder of the invention.

A particularly high quality of the boundary surface between hollow cylinder and core rod is accomplished when the etching treatment yields an etching removal with a depth of not more than 25 µm, preferably an etching removal with a depth of not more than 10 µm.

Such an etching removal in the area yields a maximum expansion of the existing cracks in lateral direction of 50 µm and 20 µm, respectively.

Preferably, the etching treatment results in an etching removal with a depth of at least 2.5 µm.

The boundary quality will be further improved if the etching treatment comprises a first etching step in an etching solution containing hydrofluoric acid and a second etching step in an etching solution containing nitric acid.

The first etching step in the etching solution containing hydrofluoric acid will effect a removal of the $SiO_2$ surface, so that the existing cracks are slightly expanded. The second etching step in an etching solution containing nitric acid will not effect a further removal of the $SiO_2$ surface, but the dissolution of existing contamination. The preceding crack expansion is conducive to the attack of the nitric acid-containing etching solution in the area of the cracks.

It has turned out to be advantageous to carry out the etching treatment at a mean etching rate of not more than 3 μm/min.

A low etching rate of less than 3 μm/min helps to observe a predetermined etching removal, especially if said removal itself is small. Preferably, the mean etching rate is not more than 1 μm/min, particularly preferably not more than 0.1 μm/min.

The quartz glass cylinder of the invention is preferably used for producing a preform for an optical fiber in an RIC method by collapsing the cylinder onto a core rod and by simultaneously elongating the cylinder with formation of the preform.

Equally preferred is a use of the quartz glass cylinder according to the invention for producing an optical fiber in an RIC-ODD method by collapsing the cylinder onto a core rod and by simultaneously elongating the same with formation of the fibers.

The invention will now be explained in more detail with reference to an embodiment and a patent drawing. In detail, FIG. 1 is a schematic view showing a profile of a fire-polished glass surface with initial cracks during progressive etching;

The production of a quartz glass cylinder according to the OVD-method will first of all be described. To this end soot particles are deposited in layers by reciprocating a number of deposition burners on a carrier rotating about its longitudinal axis, with $SiCl_4$ being supplied to the deposition burners and oxidized and hydrolyzed in a burner flame in the presence of oxygen to obtain $SiO_2$. After completion of the deposition method and removal of the carrier, a soot tube is obtained that is subjected to a dehydration treatment and introduced in vertical orientation into a dehydration furnace and treated at a temperature ranging from 850° C. to about 1000° C. in a chlorine-containing atmosphere. The treatment lasts for about six hours.

Figure 2:
FIG. 2 is a photograph of the surface of a quartz glass cylinder of the invention after mechanical treatment.

The soot tube treated in this way is then vitrified in a vitrification furnace at a temperature in the range of about 1350° C. with formation of a tubular quartz glass blank consisting of synthetic quartz glass, whose outer wall is coarsely ground by means of an NC peripheral grinder, which is equipped with a #80 grinding stone. The inner bore is treated by means of a honing machine, the degree of polish becoming continuously finer by exchanging the honing bars. The final treatment is carried out with a #800 honing bar showing a removal of about 60 μm. The photograph of FIG. 2 shows the surface of the inner wall treated in this way, which will be described further below in more detail.

The tube is subsequently etched in an etching solution containing hydrofluoric acid. In this etching solution an etching rate of about 1 μm/min ensues at room temperature. The maximum surface roughness $R_{max}$ in the area of the inner wall is thus 3.5 μm, and in the area of the outer wall it is 77 μm.

Due to the mechanical treatment of quartz glass surfaces by grinding or honing, it is not only material that is removed, but subsurface cracks are also produced. Since such cracks are very narrow, there will be no perfect method for determining the same, i.e. neither surface roughness measurements nor optical measuring methods are able to define such subsurface cracks quantitatively.

The only method, which is however not free from destruction, consists in making the near-surface cracks visible by etching the surface. Therefore, the depth of the existing subsurface cracks is determined on a piece of the tube in a separate test in that the tube piece is etched in 68% hydrofluoric acid for such a long period of time that the crack base can be detected optically or by means of a surface roughness measuring device. The results of said crack depth measurements are summarized in column 2 of Table 1.

Figure 1:
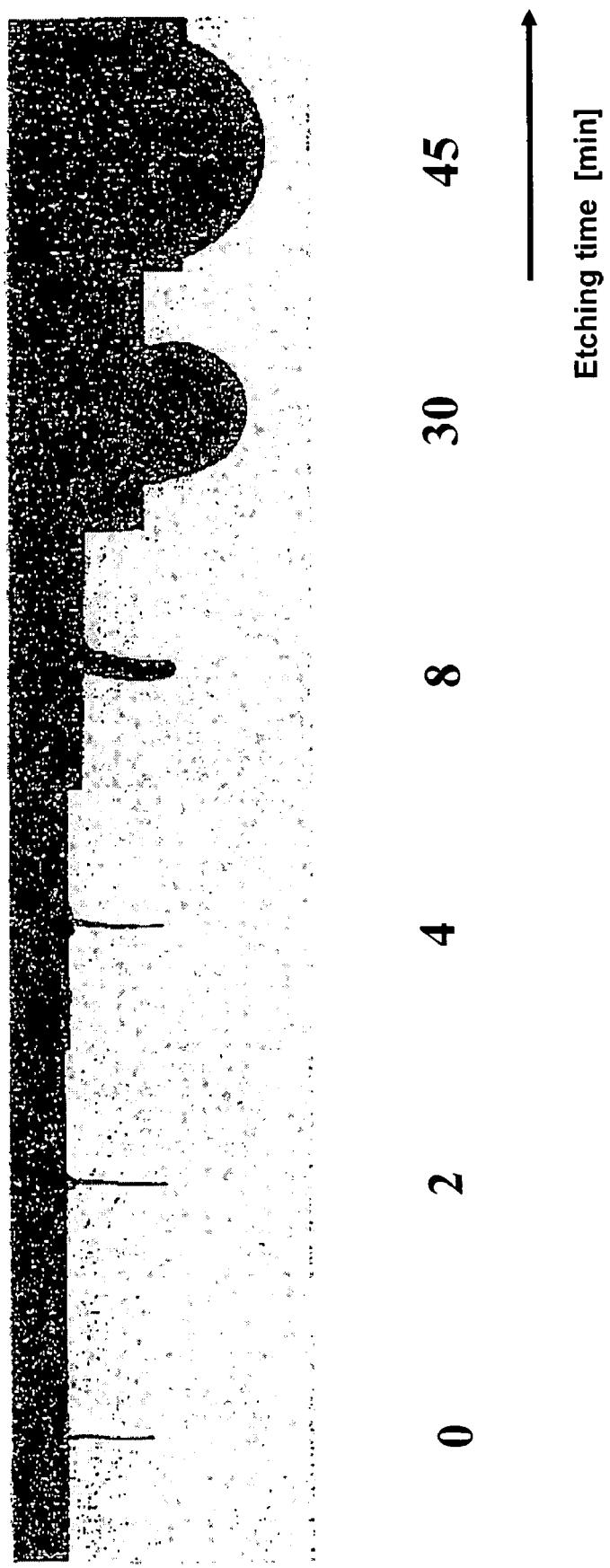

FIG. 1 shows a schematic illustration of the changing shape of a crack in a fire-polished surface with an increasing etching duration, such an illustration being known from the literature. The illustrated profile schematically shows, at position "0" (etching duration=0 minutes), a crack of a specific depth which starts from the surface. After an etching duration of 2 minutes the crack has slightly expanded and has formed a small crater at its end oriented towards the surface. The crack depth, however, has not changed, starting from the new surface which is now positioned slightly deeper. With an increasing etching duration of 4, 8, 30 and 45 minutes, respectively, a considerably increasing expansion of the crack can be observed without the depth thereof increasing on account of the etching process. The lateral boundary walls of the crack, however, are removed at about twice the speed as the planar surface. Therefore, the crack width increases with the etching duration, whereas the crack base is deepened at the same etching rate as the planar surface, so that the crack depth remains unchanged in a first approximation. Therefore, with an increasing etching duration the crack profile assumes a spherical shape.

The photograph of FIG. 2 shows the surface of a ground and, as has been described further above for the quartz glass tube, honed quartz glass sample. Despite the fine-grained polishing agent, grinding marks can be detected on the surface. However, apart from the grinding marks, the surface shown in FIG. 2 appears to be smooth; the mean surface roughness $R_a$ amounts to about 0.1 μm.

The definition of the surface roughness $R_a$ follows from EN ISO 4287 and the measurement conditions from EN ISO 4288 or EN ISO 3274, depending on whether the surface of the measurement sample has been finished, like in the instant case, by grinding and honing (non-periodic surface profile) or by turning (periodic surface profile).

Figure 3:
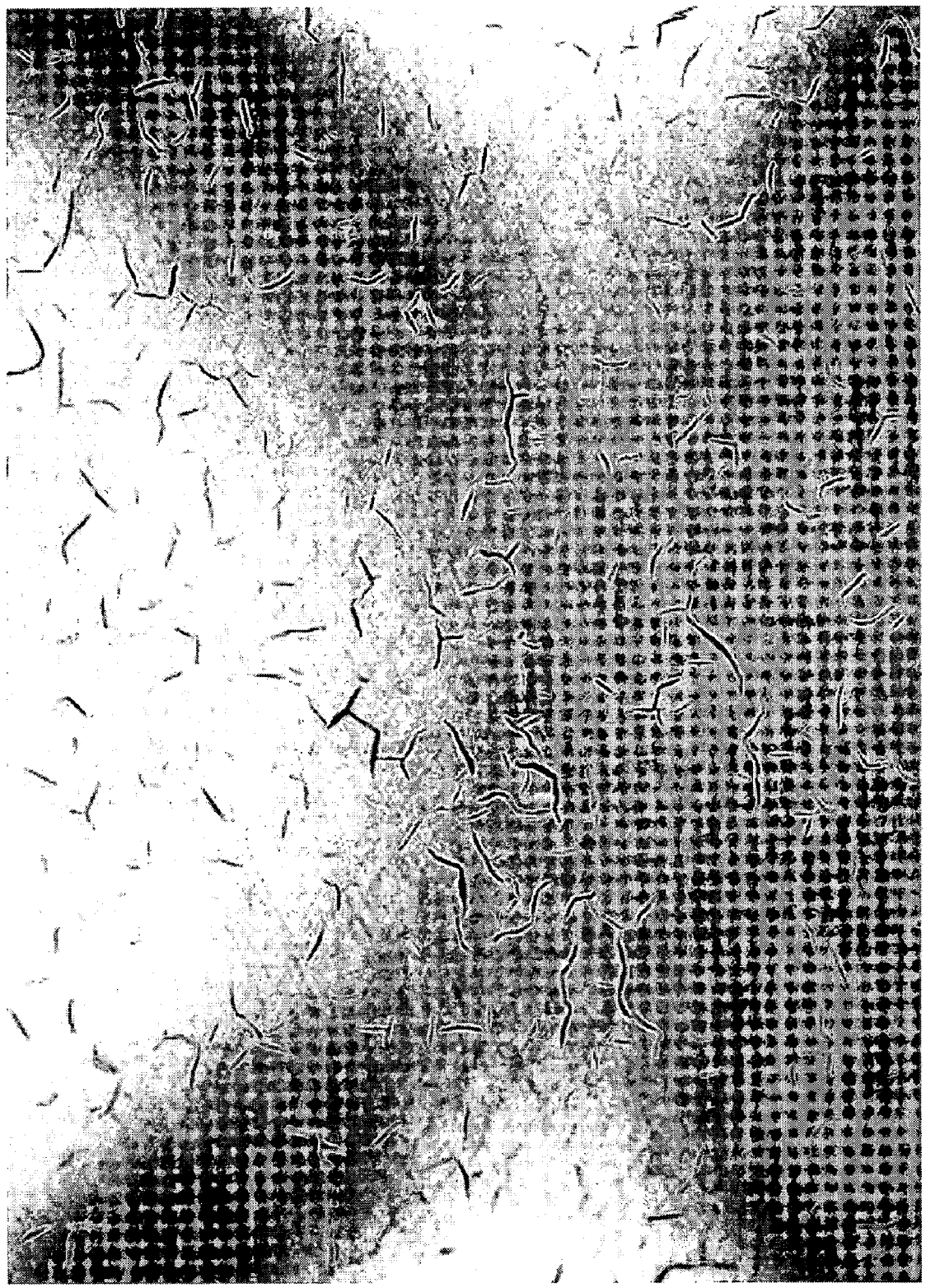
FIG. 3 is a photograph of the surface of the quartz glass cylinder of FIG. 2 after an etching process in HF-containing etching solution lasting for 1 min.

The result of a 1-minute etching of the surface treated in this way in a 68% HF solution is shown in FIG. 3. In this photograph it is still possible to make out the grinding marks as weak lines, the etching treatment also making visible grinding marks that have not been visible or have only been slightly visible in the preceding photograph. In addition, and in a particularly conspicuous manner, cracks have now also become visible that cannot be seen in the photograph of the unetched surface. The surface is covered with cracks which are narrowly distributed and occur independently of the course of the grinding marks. After the etching treatment the cracks have a width of 7 μm. It has been detected in a separate etching test that the crack depth is below 1 mm. The mean surface roughness $R_a$ is about 0.5 μm in the etched surface, measured by means of a surface roughness measurement device. Cracks with such a depth and width in the inner wall of a quartz glass cylinder can still be closed during collapsing onto the core rod in an RIC method without special measures being needed with respect to a particularly low viscosity of the inner wall.

Figure 4:
FIG. 4 is a photograph of the same surface as in FIG. 3 after an etching process in HF-containing etching solution lasting for 50 min.

A distinct deterioration of the surface quality, however, will be observed when the etching duration is prolonged to 50 minutes, as shown in the surface photograph of FIG. 4. The mean crack width of the cracks is now 140 μm after this etching treatment. The crack depth can be determined in a simple way by means of a standard surface roughness measurement device.

To determine the impact which a special kind of treatment of the inner wall of a quartz glass cylinder has on the quality of the boundary surface obtained in an RIC method between the cylinder and a core rod inserted thereinto, quartz glass cylinders are produced with a differently treated inner bore (see Table 1) and used in an RIC method, which will be described in more detail in the following.

A core rod is inserted into and fixed in the hollow cylinder of quartz glass having a quality of the inner bore as indicated in Table 1. Each of the core rods are produced by means of MCVD methods by depositing $SiO_2$ cladding and core glass layers on the inner wall of a substrate tube. To obtain core glass rods having a particularly low OH content (<1 wt ppb), hydrogen-free start substances are used, the deposition zone being heated by means of an electrically heated annular furnace surrounding the substrate tube, which is moved in the direction of the longitudinal axis of the substrate tube.

In all of the tests the cylinder has an outer diameter of 150 mm and an inner diameter of 60 mm, and the diameter of the core rod is 58 mm each time.

The composite of hollow cylinder and core rod is supplied in vertical orientation from above to an electrically heated furnace at a predetermined feed rate and is heated therein zonewise to a temperature ranging from 2000° C. to 2400° C., a preform being drawn from the softened area. The advance movement is the same in all cases and the draw-off rate is controlled such that the desired diameter of the preform of 85.0 mm +/−0.5 mm is obtained. The other process parameters, of which the drawing temperature must particularly be named, are not changed. A vacuum ranging from 2 kPa to 10 kPa is maintained in the annular gap between core rod and hollow cylinder of 1 mm.

The quality of the boundary surface between the core region of the preform and the cladding glass provided by the hollow cylinder is examined by microscopy, special attention being paid to elongated bubbles along the boundary surface. Moreover, the fiber strength of the fibers obtained from the preforms is measured by stretching said fibers by 1% of their initial length, and the costs entailed by the production of the quartz glass cylinder are estimated. The qualitative results obtained are listed in the last three columns of Table 1, the symbol "++" meaning "very good", "+" "good" and "−" poor.

The tensile strength of the fibers as indicated in column 5 of the table describes the purity of the boundary surface. Particles in the area of the boundary surface between the quartz glass deriving from the core rod and the cladding glass may impair the fiber strength. Purity can be improved at any rate by etching the cylinder prior to the RIC process. In tests according to Table 1, an etching removal in HF-containing solution of about 1 μm/min was set. However, the quality of the surface as a consequence of the preceding mechanical treatment must be taken into account in the etching process. The etching removal in the area as indicated in column 3 of Table 1 leads to a crack width that is twice as large in terms of figures. When the existing subsurface cracks are enlarged by etching to such an extent that crack widths of more than 100 μm are created, this will be noticed in a deterioration of the boundary surface quality. This is shown by tests 10 and 11 in which due to an etching removal of 100 μm a crack width of 200 μm has been produced, as compared with the better boundary surface qualities obtained in tests 4 and 5 at about half the removal depth. Although subsurface cracks can be minimized by a particularly troublesome mechanical treatment, the efforts required therefor cannot be justified economically, as hinted at by samples no. 9 and no. 12.

TABLE 1

| | Treatment of the inner wall of the hollow cylinder | | | | |
|---|---|---|---|---|---|
| No. | Max. crack depth by mechanical treatment [mm] | Removal by etching treatment (=½ × crack width) [μm] | Quality of the boundary surface | Tensile strength of fiber | Costs |
| 1 | 3 | 0 | + | − | ++ |
| 2 | 2 | 0 | + | − | ++ |
| 3 | 1 | 0 | + | − | + |
| 4 | 2 | 40 | + | + | ++ |
| 5 | 2 | 30 | ++ | + | ++ |
| 6 | 2 | 20 | ++ | + | ++ |
| 7 | 1 | 40 | ++ | + | + |
| 8 | 1 | 20 | ++ | + | + |
| 9 | 0.025 | 20 | ++ | ++ | − |
| 10 | 1 | 100 | − | + | + |
| 11 | 2 | 100 | − | + | + |
| 12 | 0.025 | 100 | ++ | ++ | − |

Hence, it follows from the data of Table 1 that disadvantageous results are obtained in both a coarse and a very fine mechanical treatment of the inner bore of the hollow cylinder, but also in the absence of an etching process or in the case of a long etching process.

The invention claimed is:

1. A method for producing a quartz glass article, for producing an optical component, the method comprising the steps of:
   providing a quartz glass cylinder having an inner bore therein,
   mechanically treating the inner bore to a final dimension; and then
   applying an etching treatment to the inner bore,
   wherein the step of mechanically treating the inner bore comprises a plurality of removal processes each with a successively smaller removal depth such that,
   the inner bore has closed subsurface cracks therein, and all of the closed subsurface cracks in the inner bore have depths of not more than 2 mm after the last removal process, and
   wherein the inner bore is subsequently subjected to the etching treatment so as to produce an etching removal with a depth of not more than 50 μm, and such that the inner bore has an etched structure that has cracks therein, all of said cracks having a depth of not more than 2.0 mm and a width of not more than 100 μm.

2. The method according to claim 1, wherein the etching treatment yields an etching removal with a depth of not more than 25 μm.

3. The method according to claim 1, wherein the etching treatment yields an etching removal with a depth of not more than 10 μm.

4. The method according to claim 1, wherein the etching treatment yields an etching removal with a depth of at least 2.5 μm.

5. The method according to claim 1, wherein the etching treatment includes a first etching step in a first etching solution containing hydrofluoric acid, and a second etching step in a second etching solution containing nitric acid.

6. The method according to claim 1, wherein the etching treatment is carried out at a mean etching rate of not more than 3 μm/min.

7. The method according to claim 6, wherein the mean etching rate is not more than 1 μm/min.

8. The method according to claim 6, wherein the mean etching rate is not more than 0.1 μm/min.

9. The method according to claim 1, and further comprising inserting a core rod in the inner bore of the quartz glass cylinder, and forming a preform from said core rod and said quartz glass cylinder.

* * * * *